(12) United States Patent
Baptista et al.

(10) Patent No.: US 6,553,760 B1
(45) Date of Patent: Apr. 29, 2003

(54) CONTROL DEVICES OF A HYDROSTATIC TRANSMISSION

(76) Inventors: Fernando Augusto Baptista, 4400-238, Vila Nova de Gaia (PT); João Manuel Pereira Dias Baptista, 4740, Esposende (PT)

(*) Notice: Subject to any disclaimer, the term of this patent is extended or adjusted under 35 U.S.C. 154(b) by 0 days.

(21) Appl. No.: 09/926,288
(22) PCT Filed: Nov. 30, 1999
(86) PCT No.: PCT/PT99/00018
§ 371 (c)(1), (2), (4) Date: Oct. 9, 2001
(87) PCT Pub. No.: WO00/61971
PCT Pub. Date: Oct. 19, 2000

(30) Foreign Application Priority Data

Apr. 8, 1999 (PT) ................................................ 102285

(51) Int. Cl.[7] ............................................... F16D 31/02
(52) U.S. Cl. .......................................... 60/452; 60/487
(58) Field of Search ..................... 60/452, 489; 91/497; 92/12.1

(56) References Cited

U.S. PATENT DOCUMENTS

| | | | |
|---|---|---|---|
| 3,354,637 A | | 11/1967 | Croswhite |
| 3,379,006 A | * | 4/1968 | Eickmann .................... 60/452 |
| 3,808,814 A | | 5/1974 | Macy, II |
| 3,809,500 A | * | 5/1974 | Staudenrausch ............ 417/220 |
| 3,890,782 A | | 6/1975 | Wauson |
| 3,959,969 A | | 6/1976 | Tittmann et al. |

FOREIGN PATENT DOCUMENTS

GB 992587 5/1965

* cited by examiner

Primary Examiner—Edward K. Look
Assistant Examiner—Thomas E. Lazo
(74) Attorney, Agent, or Firm—Hoffman, Wasson & Gitler, PC

(57) ABSTRACT

The invention refers to control devices applied in a hydrostatic transmission, which includes a motor pump MP, a hydrostatic circuit HC 1 and HC 2 and an impelling pump IP, which is formed by a rotor 1, a stator 2 and a body 3; the fluid debit is infinitely variable and is obtained by the radial and variable decentralisation of the said stator 2, by means of the impulsion of the rods A and B.

The devices are constituted by pistons 4 and 5, which impel the rods A and B, and are inserted in cylinders 6 and 7; by springs systems 9, 10 and 11, which regulate the position of the pistons and of the rods, and by a command formed by a valve 8, inserted in a vacuum circuit with ways V1 and V2, which communicate with the cylinder 7.

Through way V1 the vacuum effect acts on the piston 5, obtaining the decentralisation of the stator 2 in direction of the rod A; the fluid pressure transmitted by the extension HE to the piston 4, regulates the debit of the impelling pump and the rotation speed of the motor pump, whose rotation direction is the same as the impelling pump, FIG. 1.

Through way V2 the decentralisation of the stator 2 is obtained in the inverse direction to the rod A, and the rotation direction of the motor pump is inverse of the rotation direction of the impelling pump, FIG. 2.

When the command is not activated, no fluid impulsion is transmitted by the impelling pump and there is no rotation of the motor pump, FIG. 3.

13 Claims, 3 Drawing Sheets

CONTROL DEVICES OF A HYDROSTATIC TRANSMISSION

BACKGROUND OF THE INVENTION

1. Field of the Invention

The present invention simplifies and renders practical the control of hydrostatic transmissions in which the pumps, with either impelling or motor functions, are preferably of the rotational type and of infinitely variable debit of fluid, so that the variation of the said debit may be automatic, according to the variation of the pressure in the fluid circuit of the transmission. The said pumps have an internal stator 2, which is decentralised in axial way, between the rotor 1 and the box or external stator 3 by means of the rods A and B.

A fundamental characteristic of the said pumps is the fact that the variable work pressures of the fluid, which act on the internal side of the stator 2, are compensated and balanced on the corresponding external side by equal fluid pressures.

2. Description of the Related Art

In the previous hydrostatic transmissions of the rotational type and of variable debit, a great obstacle has been the great strength that is necessary to be applied in the impulsion of the internal stator in order to be obtained the variation of the amplitude and direction of its decentralisation.

The said impulsion is opposed by the work pressures of the fluid, which are produced in the internal side of the stator and which are opposed to the said variation due to the fact that they are not balanced by equal pressures on the external and opposed side.

As a consequence, it is necessary to have impulsion systems based on "screw systems" or based on the hydrostatic systems of a great strength and of a very complicated construction.

In short, there are several negative facts in the previous types of hydrostatic transmissions:—lack of compensation and balance of the work pressures between the internal and the external sides of the movable stator;—excessive number of devices with heavy weight and high obstruction;—complicated and slow control;—the variation of the fluid debit does not automatically respond to the pressure variation generated in the proper transmission circuit, resulting from the variation of its work load.

These negative facts have been preventing its application in numerous work situations for hydrostatic transmissions.

For instance, in the hydrostatic transmission type described in the Document U.S. Pat. No. 3,354,637 A (CROSWHITE), the movable stator is not balanced in a hydrostatic way with the work forces of the fluid and its decentralisation can only be obtained by means of a strong system of levers, resulting in an excessive and heavy obstruction.

The command system is a complication of hydrostatic valves which are in their turn connected to a complication of hydrostatic cylinders of fluid supply.

Besides, there is not a direct automatism between the variation of the fluid pressure in the main hydrostatic circuit, which results from the variation of the work load and the debit variation of the said fluid.

This kind of hydrostatic transmission, which must be equipped with complicated and large performance and control devices and which do not possess a direct automation, cannot have an easy practical application.

It is obvious that they do not have anything similar to the simplification and lightness of the control devices and to the direct automatism, which are fundamental characteristics of the present and new invention.

In the new invention, one piston only direct supplied by the fluid pressure of the proper transmission circuit and in co-operation with a simple system of laminar springs, performs automatically the variation of the stator decentralisation, which results in the direct obtaining of the variation of the fluid debit in correspondence with the variation of the work load of the transmission.

The considerations previously stated can be applicable in relation, to the transmission type described in the Document U.S. Pat. No. 3,890,787 A (VAUSON WARREN C) and in the following documents:

GB 992 587 A (VEB INDUSTRIEWERKE KARL-MARK-STADT:

U.S. Pat. No. 3,959,969 (TITTMANN EGON ET AL);

U.S. Pat. No. 3,808,814 A (MACY R).

SUMMARY OF THE INVENTION

The invention refers to control devices applied in a hydrostatic transmission, which includes a motor pump MP, a hydrostatic circuit HC 1 and HC 2, and an impelling pump IP, which is formed by a rotor 1, a stator 2 and a body 3; the fluid debit is infinitely variable and is obtained by the radial and variable decentralisation of the said stator 2, by means of the impulsion of the rods A and B.

The devices are constituted by pistons 4 and 5, which impel the rods A and B, and are inserted in cylinders 6 and 7; by springs systems 9, 10 and 11, which regulate the position of the pistons and of the rods, and by a command formed by a valve 8, inserted in a vacuum circuit with ways V1 and V2, which communicate with the cylinder 7.

Through way V1 the vacuum effect acts on the piston 5, obtaining the decentralisation of the stator 2 in direction of the rod A; the fluid pressure transmitted by the extension HE to the piston 4, regulates the debit of the impelling pump and the rotation speed of the motor pump, whose rotation direction is the same as the impelling pump, FIG. 1.

Through way V2 the decentralisation of the stator 2 is obtained in the inverse direction to the rod A, and the rotation direction of the motor pump is inverse of the rotation direction of the impelling pump, FIG. 2.

When the command is not activated, no fluid impulsion is transmitted by the impelling pump and there is no rotation of the motor pump, FIG. 3.

EXPLANATION OF THE INVENTION

Due to the fundamental characteristics of compensation and balance of the external and internal pressures to the movable stator 2, the basic purposes of the invention are: to reduce the number of control devices and to simplify their shape in order to obtain an insignificant obstruction; to optimize their functioning in order to obtain a direct decentralization variation of the stator and the corresponding automatic variation of the fluid debit in correspondence with the variation of work load of the transmission.

In a previous application, we developed a hydrostatic pump IP, of infinitely variable debit, which includes a rotor 1, a stator 2 and a body 3; the infinitely variable debit is obtained by the radial and variable decentralisation of the said stator by means of the impulsion of the rods, A and B.

The different work pressures of the fluid, which act on each internal side of the stator, are compensated and balanced on the corresponding external side by equal fluid pressures transmitted to chambers; each one of the said chambers is contiguous to each one of the sides.

A great advantage of the application of this method is that the strength applied in the impulsion of the rods is small and independent from the work pressures of the fluid; this fact permits the application of the adequate devices, in order to obtain an easy and safe control of the variation of the amplitude and of the direction of the decentralization of the stator of a hydrostatic pump, either its function is impelling or motor.

The said control devices of a hydrostatic transmission are constituted by pistons 4 and 5, which give impulse to the rods A and B and are inserted in cylinders 6 and 7; by systems of springs 9, 10 and 11, which regulate the position of the pistons and of the rods; and by a transmission control formed by a valve 8, inserted in a vacuum circuit with two ways V1 and V2, which communicate with the second cylinder 7.

The application and the functioning of the said devices, are explained below with the help of the description of three illustrative examples, and without a limited character, of the conception and application of the said devices, which perform the present invention in the preferred form.

DESCRIPTION OF THE PREFERRED EMBODIMENT

Figure 1:
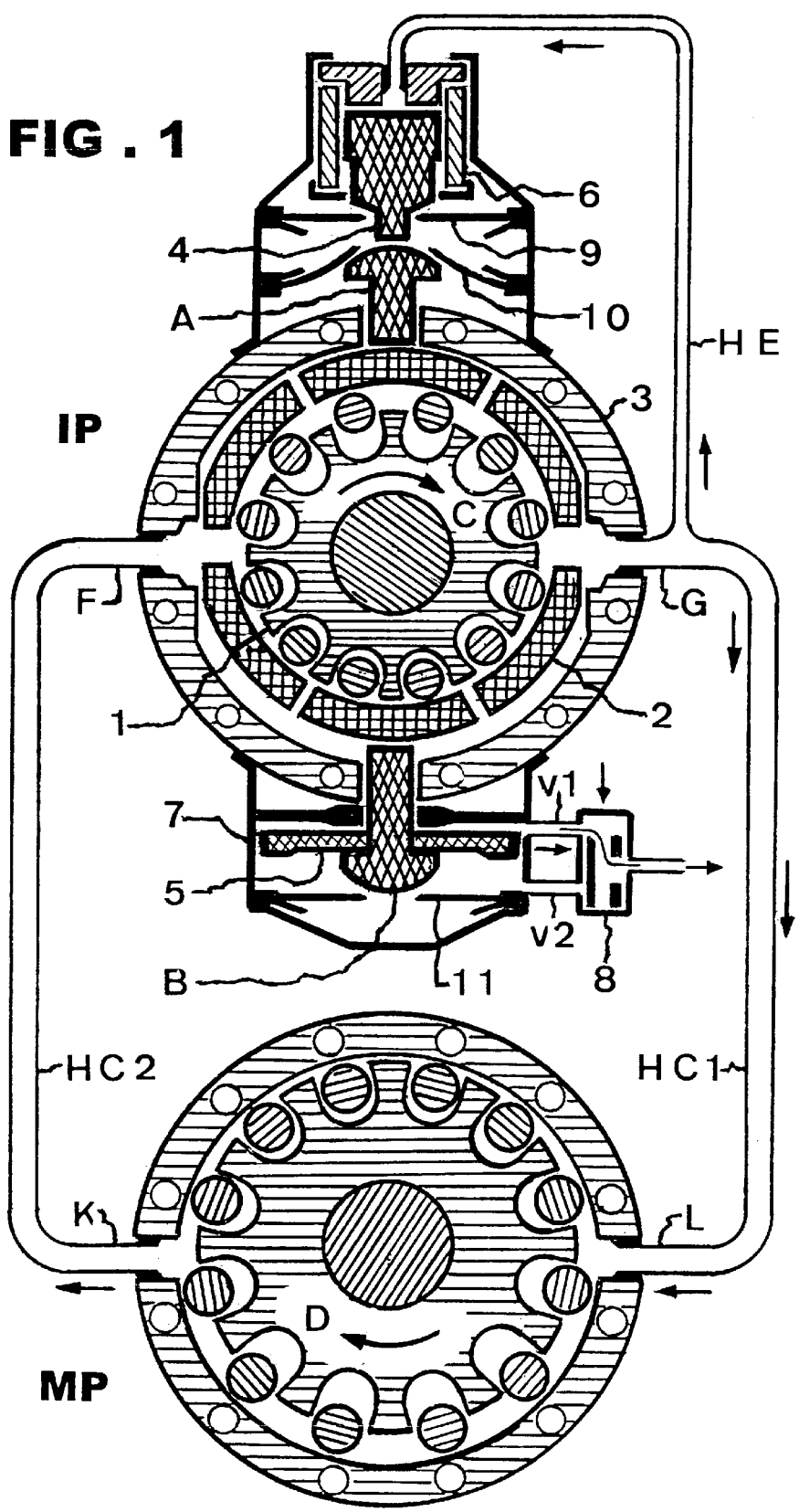
FIG. 1, represents in section the application of the control devices in a hydrostatic transmission, in which the decentralisation of the stator 2 is obtained in the direction of the rod A; the motor pump MP has the same direction of the rotation of the impelling pump IP.

Considering the application of the control devices in a hydrostatic transmission of infinitely variable speed, which includes an impelling pump as the one described above IP, associated with a motor pump MP by means of a fluid circuit HC 1 and HC 2, the said application is performed as follows:

in the impelling pump IP, the piston 4 is inserted in the first cylinder 6, it has a simple effect and impels the rod A through the top; its retrocession is obtained by means of a system of springs 9; the said cylinder communicates with the side HC 1 of the hydrostatic circuit of the transmission, by means of a hydrostatic extension HE;

the piston 5 is inserted in the second cylinder 7, it has a double effect and is fastened with the rod B; its balance position is obtained by the joint action of the springs systems 10 and 11, and its impulsion is regulated by the transmission command;

the regulation of the transmission command is obtained by the valve 8 regulation directing, through ways V1 or V2, the activation of the vacuum effect to the second cylinder 7, in order to obtain the impulsion of the respective piston 5, in the direction of the decentralisation of the stator, determined by the said command.

DETAILED DESCRIPTION

Figure 2:
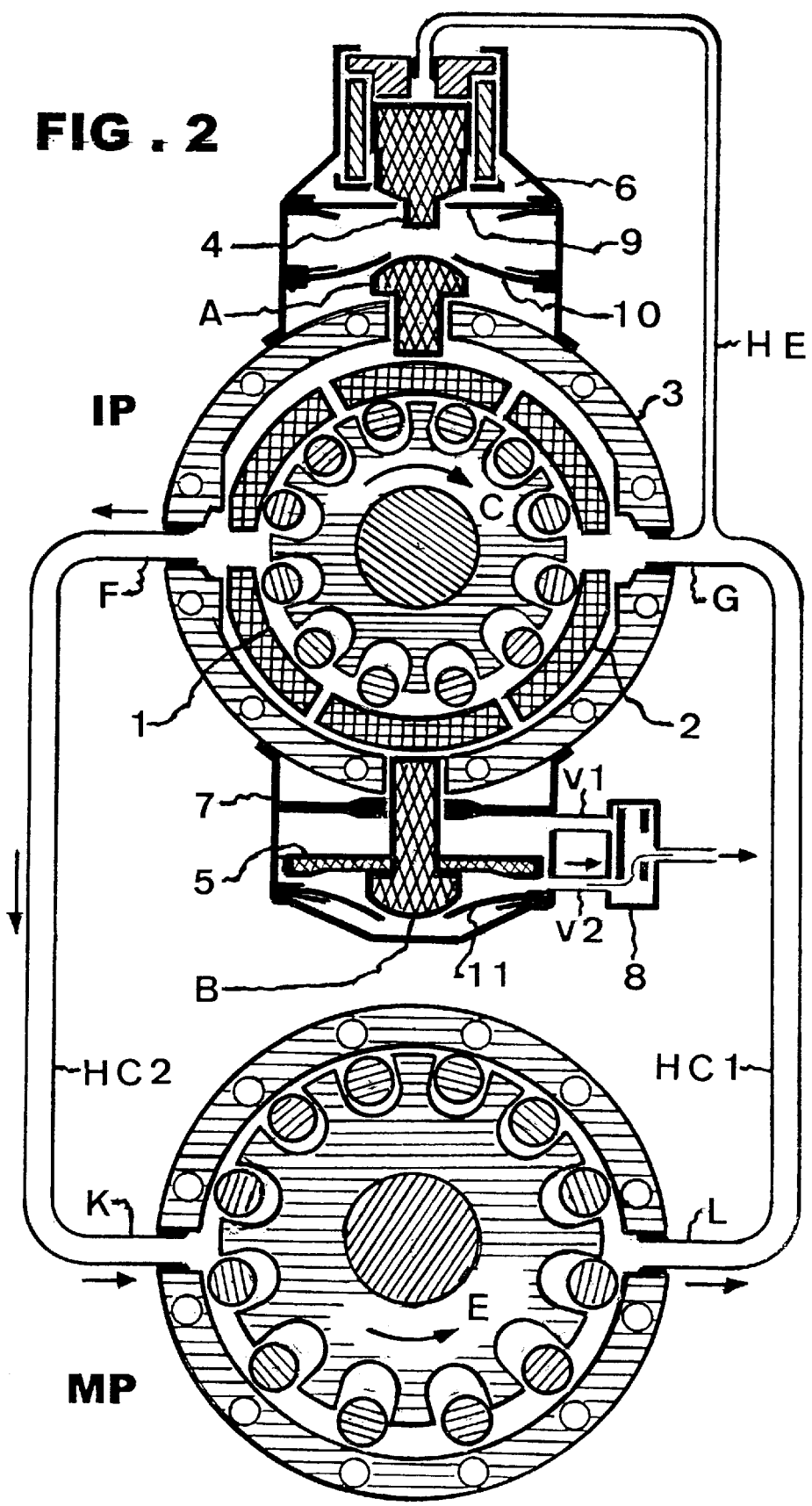
FIG. 2, represents in section the application, in which the decentralisation of the stator 2 is obtained in the inverse direction of the rod A; the rotation direction of the motor pump is inverse of the impelling pump.
Figure 3:
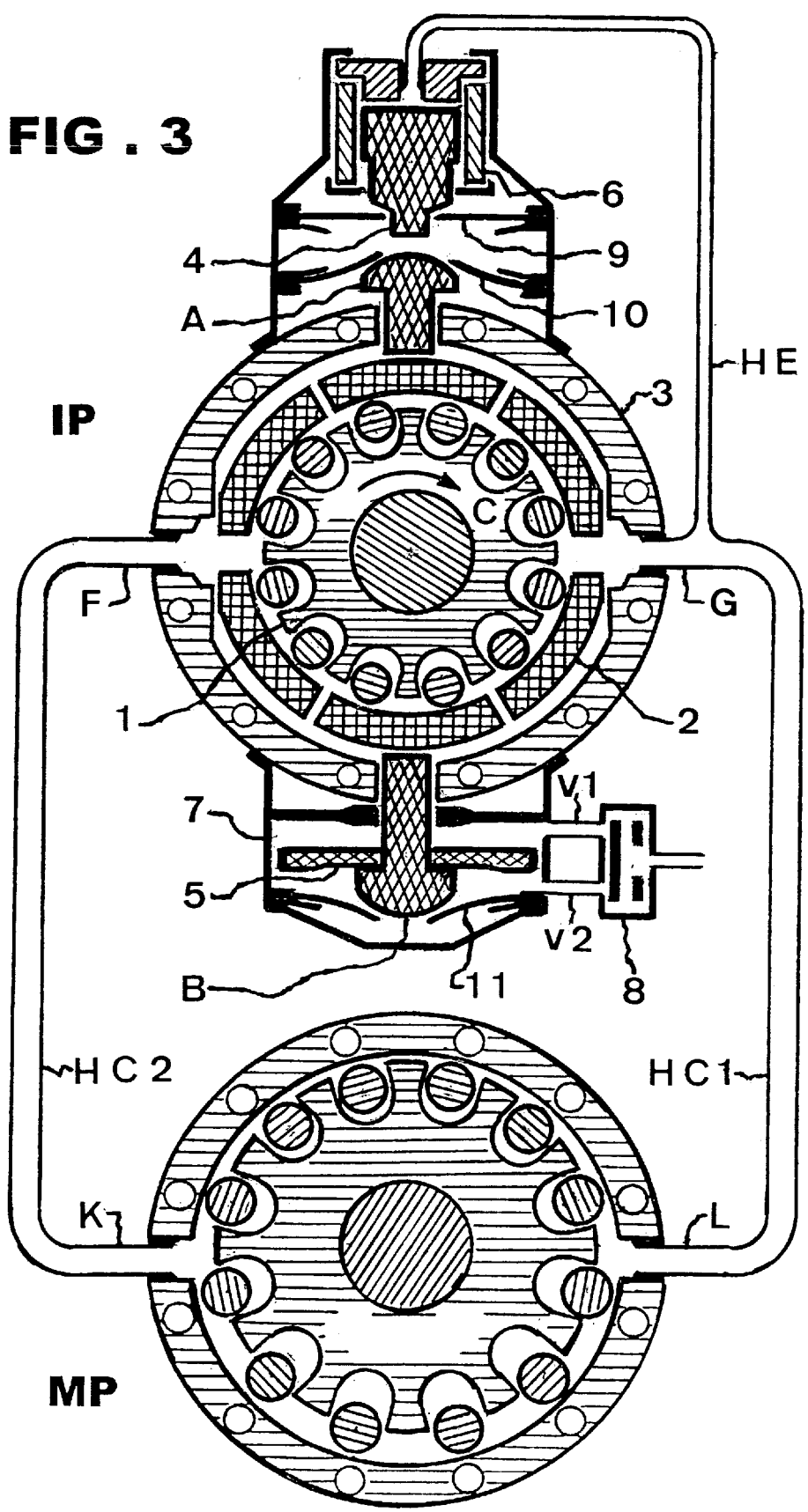
FIG. 3, represents in section the application, in which the stator is in a centralized position; no fluid impulsion is transmitted by the impelling pump and there is no rotation of the motor pump.

FIGS. 1, 2 and 3 of the drawings, show the functioning of a hydrostatic transmission of infinitely variable speed, in which the control devices are applied to an impelling pump IP of infinitely variable debit, as it was described above.

In FIG. 1, the motor pump MP has the same rotation direction of the impelling pump IP;

the transmission command directs the activation of the vacuum effect through way V1 to the second cylinder 7, in order to impel the piston 5 and the rod B which is fastened to it, in the direction of the rod A; it is obtained the decentralization of the stator of the impelling pump IP in the direction of the said rod A;

agreeing that the rotor rotation of the impelling pump IP is in the direction C, the fluid is impelled by the said rotor in the direction from F to G; it acts in the rotor of the motor pump MP in the direction from L to K, and the rotation of its rotor is obtained in direction D equal to the direction C, of the rotor rotation of the impelling pump.

The debit variation of the impelling pump and the corresponding speed variation of the motor pump, are going to be explained as follows:

to an increase in resistance, which opposes to the rotor rotation of the motor pump, there is the correspondence of an increase in the normal work strength of the binary motor, which activates the rotor of the impelling pump; to the increase in the said strength there is the correspondence of an increase in the fluid pressure, on the side HC 1 of the circuit of the hydrostatic transmission; by means of a hydrostatic extension HE, the said pressure increase is transmitted to the first cylinder 6; the respective piston 4 impels the rod A, in order to reduce the amplitude of the decentralisation of the stator, so that the balance level of the said normal work strength of the binary motor may be re-established;

to a decrease of the said resistance, there is the correspondence of a pressure decrease in the circuit HC 1, transmitted by the extension HE to the cylinder 6; the springs system 9 performs the piston retrocession 4, and it is recovered the amplitude of the decentralisation of the stator referring to the anterior cycle;

in the impelling pump IP the amplitude of the decentralisation of the stator and the corresponding fluid debit, have a decreasing variation in relation to the increasing variation of said resistance, which opposes to the rotation of the motor pump MP;

the rotation speed of the said motor pump, also has a decreasing variation, in relation to the increasing variation of the said resistance.

In FIG. 2, the motor pump MP has the rotation direction inverse to the one of the impelling pump IP;

the transmission command controls the activation of the vacuum effect through way V2 to the second cylinder 7, in order to impel the piston 5 and the rod B, which is fastened to it in the inverse direction to the one of the rod A; it is obtained the decentralisation of the stator in the direction of the rod B, inverse to the direction of the anterior decentralisation;

in the impelling pump IP the fluid circulates in the direction from G to F and in the motor pump MP from K to L; the rotor rotation of the motor pump is in the direction E, inverse to the direction C of the rotor rotation of the impelling pump.

In FIG. 3, the motor pump has no rotation movement, though the rotation of the impelling pump is maintained;

the transmission command is not activated; the valve 8 is closed and no vacuum effect is transmitted; the stator 2 of the impelling pump IP is centralised and balanced by the action of the springs systems 10 and 11;

no fluid impulsion is transmitted, regardless of the speed rotation of the said impelling pump.

Several Applications

The control devices which were described with reference to their application to a hydrostatic transmission, which includes a motor pump, may be also applied to other types of hydrostatic transmissions, for example, replacing the motor pump by either static or linear movement hydrostatic devices.

The said devices may be also applied to a motor pump or simultaneously to an impelling pump and a motor pump.

The invention claimed is:

1. A control device for a hydrostatic transmission,
   said transmission including a motor pump, in communication with an impelling pump by means of a fluid circuit, said impelling pump comprising a rotor and a stator contained inside a body;
   the fluid debit of said impelling pump is infinitely variable, in accordance with the infinitely variable amplitude of the radial decentralization of said stator, obtained by means of the impulsion of a first and second rod; the variable work pressures of the fluid which act in each internal side of said stator are compensated and balanced on the corresponding external side, by equal fluid, thus resulting to be small and independent from the said work pressures of the fluid, the needed force applied in the impulsion of said first and second rods; said control devices of a hydrostatic transmission comprising:
      a first cylinder, which communicates with the side of the hydrostatic circuit by means of the hydrostatic extension; said first cylinder contains a first piston which actuates on said first rod in order to obtain the infinitely variable decentralization of said stator;
      a second cylinder communicating with a vacuum feeding circuit, by means of first and second ways; said first and second ways connected to a valve which commends the direction of actuation of the vacuum; said second cylinder contains a second piston fastened with said second rod, said second rod acting in order to obtain the variation of the direction of the circulation of the fluid in said transmission; and
      first, second and third spring systems, of laminar type, whose pressure control the reciprocating position of said first and second pistons and the reciprocating position of said first and second rods.

2. The control device, according to claim 1, wherein the first piston of the first cylinder impels the first rod through the top and its retrocession is obtained by means of the first spring system.

3. The control devices, according to claim 1, wherein the second piston of the second cylinder is fastened with the second rod and its balance position is obtained by the joint action of the second and third springs systems.

4. The control devices, according to claim 1, wherein the variable pressure obtained on the side of the fluid circuit of the transmission, and produced by the variable resistance which opposes rotation of the motor pump, is transmitted to the first cylinder by an extension of the said fluid circuit.

5. The control devices, according to claim 4, wherein said variable pressure transmitted to the first cylinder acts on the first piston; said first piston impels the first rod, in order to obtain a decreasing variation of the amplitude of the decentralization of the stator of the impelling pump, in correspondence with the increasing variation of said pressure.

6. The control devices, according to claim 1, further comprising a transmission command formed by said valve inserted in a vacuum circuit with first and second ways, which communicate with the second cylinder.

7. The control devices, according to claim 6, wherein the regulation of the transmission command is performed by said valve, directing through said first or second ways the activation of the vacuum effect to the second cylinder, in order to obtain the impulsion of the second piston, and the decentralization of the stator, in the direction determined by the said command.

8. The control devices of a hydrostatic transmission, according to claim 1, wherein:
   the transmission command drives the valve and directs the activation of the vacuum effect in the direction of the first way, in order to obtain the decentralization of the stator in the direction of the first rod; the rotation of the motor pump in the same rotation direction of the impelling pump; the decreasing variation of the rotation speed of said motor pump, in correspondence with the increasing variation of the resistance which opposes to its rotation;
   said command drives the valve and directs the activation of the vacuum effect in the direction of the second way, in order to obtain the decentralization of the stator in direction of the second rod, inverse to the one of the first rod; the rotation of the motor pump in the inverse direction to the rotation of the impelling pump;
   said command closes the valve, does not activate the vacuum effect and achieves the centralization and balance of the stator, by the joint action of the second and third springs systems, in order to be not transmitted any impulsion fluid, regardless of the speed rotation of the impelling pump; the motor pump has no rotation movement, though the rotation of the impelling is maintained.

9. The control devices of a hydrostatic transmission, according to claim 1, wherein the impelling pump or the motor pump, are static hydrostatic apparatus, or hydrostatic apparatus of linear movement.

10. The control devices of a hydrostatic transmission, according to claim 1, wherein being applied identically to a motor pump, or simultaneously to an impelling pump and a motor pump.

11. A hydrostatic transmission comprising:
    a hydrostatic pump;
    said hydrostatic pump having a housing, a rotor, a stator about said rotor, a first rod for decentralizing the stator in the housing, and a second rod for decentralizing the stator in the housing;
    a motor pump,
    a fluid circuit extending between said hydrostatic pump and said motor pump, said fluid circuit having a first branch and a second branch;
    a control device for controlling the transmission, said control device comprising:
       a first cylinder attached to said hydrostatic pump housing,
       a first piston in said first cylinder for moving said first rod,
       a fluid extension extending between said first cylinder and a branch of said fluid circuit,
       a second cylinder attached to said hydrostatic pump housing, a second piston in said second cylinder for moving said second rod, a piston control device for causing movement of said first and second pistons, said piston control device having a valve connected to said second cylinder, said valve has a first port in communication with the space between said second piston and said housing and a second port in communication with the space between said second piston and the top of the second cylinder.

12. The hydrostatic transmission of claim 11, wherein said control device comprises:

a fluid extension conduit extending between said second cylinder and a branch of said fluid circuit.

13. The hydrostatic transmission of claim 11, wherein said first rod and said second rod are diametrically opposed.

* * * * *